US012659995B2

(12) United States Patent
Shi

(10) Patent No.: US 12,659,995 B2
(45) Date of Patent: Jun. 16, 2026

(54) METHOD, DEVICE AND NON-TRANSITORY COMPUTER READABLE MEDIUM FOR RTS/CTS ADAPTIVE ENABLEMENT/DISABLEMENT

(71) Applicant: Samsung Electronics Co., Ltd., Suwon-si (KR)

(72) Inventor: Guotao Shi, Suzhou Industrial Park (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 385 days.

(21) Appl. No.: 18/360,031

(22) Filed: Jul. 27, 2023

(65) Prior Publication Data

US 2024/0098788 A1     Mar. 21, 2024

(30) Foreign Application Priority Data

Sep. 21, 2022    (CN) .......................... 202211151557.6

(51) Int. Cl.
H04W 74/0816          (2024.01)
(52) U.S. Cl.
CPC ............................... H04W 74/0816 (2013.01)
(58) Field of Classification Search
CPC ................................................ H04W 74/0816
See application file for complete search history.

(56) References Cited

U.S. PATENT DOCUMENTS

| | | | |
|---|---|---|---|
| 7,477,627 | B2 | 1/2009 | Ginzburg et al. |
| 9,374,834 | B2 | 6/2016 | Kneckt et al. |
| 9,516,672 | B2 | 12/2016 | Bhanage et al. |
| 9,713,169 | B2 | 7/2017 | Xie |
| 9,736,850 | B2 | 8/2017 | Merlin et al. |
| 9,838,900 | B2 | 12/2017 | Zhou et al. |
| 10,264,606 | B2 | 4/2019 | Zhou et al. |
| 10,736,141 | B2 | 8/2020 | Garde et al. |
| 2005/0041616 | A1 | 2/2005 | Ginzburg et al. |
| 2015/0063189 | A1* | 3/2015 | Merlin .................. H04W 72/53 |
| | | | 370/312 |
| 2016/0309482 | A1* | 10/2016 | Verma ............... H04W 52/0238 |
| 2017/0064741 | A1* | 3/2017 | Zhou ................. H04W 74/0816 |
| 2019/0273580 | A1* | 9/2019 | Petkov .................... H04L 1/203 |

FOREIGN PATENT DOCUMENTS

| | | |
|---|---|---|
| CN | 103269502 A | 8/2013 |
| CN | 105338646 A | 2/2016 |
| CN | 107079352 A | 8/2017 |
| CN | 108882310 A | 11/2018 |
| CN | 111542124 A | 8/2020 |

* cited by examiner

*Primary Examiner* — Kevin M Cunningham
(74) *Attorney, Agent, or Firm* — Harness, Dickey & Pierce, P.L.C.

(57)          ABSTRACT

A method and device for RTS/CTS adaptive enablement/disablement are provided. The method for RTS/CTS adaptive enablement includes changing a first state to a second state in response to determining that a first packet error rate satisfies a condition, the first packet error rate being measured in the first state, and each of the first state and the second state corresponding to a different one of an RTS/CTS enabled state and an RTS/CTS disabled state, and determining whether to change from the second state to the first state based on a second packet error rate and a threshold, the second packet error rate being measured in the second state.

20 Claims, 10 Drawing Sheets

METHOD, DEVICE AND NON-TRANSITORY COMPUTER READABLE MEDIUM FOR RTS/CTS ADAPTIVE ENABLEMENT/DISABLEMENT

This application claims priority to Chinese Patent Application No. 202211151557.6 filed on Sep. 21, 2022, and all the benefits accruing therefrom under 35 U.S.C. § 119, the disclosure of which is incorporated herein by reference in its entirety.

TECHNICAL FIELD

The disclosure relates to the communication technology field, and in particular, to a method and device for RTS/CTS adaptive enablement/disablement.

BACKGROUND

The IEEE 802.11 standard defines an optional Request to Send (RTS)/Clear to Send (CTS) mechanism. RTS/CTS mechanism is widely used in wireless data transmission to solve the hidden node challenge in wireless networks.

Currently, a fixed threshold for packet size is usually pre-set or alternatively, given in a node to determine whether to start the RTS/CTS mechanism. When the packet size to be transmitted by the node exceeds the threshold, the RTS/CTS mechanism is enabled. Otherwise, the RTS/CTS mechanism is not enabled. However, if the node is in an interference environment where many hidden nodes exist and transmits smaller packets frequently, the RTS/CTS mechanism is not enabled because the sizes of these packets do not exceed the threshold. The data transmission will fail (or have an increased likelihood of failure), which will result in lower data rate and throughput. If the node is in a clean environment with fewer hidden nodes and transmits larger packets frequently, the RTS/CTS mechanism is enabled because the sizes of these packets exceed the threshold. The waiting time and power consumption will increase, which will reduce the channel utilization and throughput.

SUMMARY

The present disclosure provides a method for RTS/CTS adaptive enablement/disablement to solve at least the challenges in the related technology corresponding to the difficulty of controlling the enablement and disablement of RTS/CTS according to actual scenario implementations, resulting in lower wireless channel utilization and/or throughput.

According to embodiments of this disclosure, a method for RTS/CTS adaptive enablement is provided, the method includes changing a first state to a second state in response to determining that a first packet error rate satisfies a condition, the first packet error rate being measured in the first state, and each of the first state and the second state corresponding to a different one of an RTS/CTS enabled state and an RTS/CTS disabled state, and determining whether to change from the second state to the first state based on a second packet error rate and a threshold, the second packet error rate being measured in the second state.

According to embodiments of this disclosure, the method further includes measuring the first packet error rate or the second packet error rate according to a time period.

According to embodiments, the first state is the RTS/CTS disabled state, the second state is the RTS/CTS enabled state, and the condition is that the first packet error rate is greater than the threshold, or the first state is the RTS/CTS enabled state, the second state is the RTS/CTS disabled state, the first packet error rate is one of a plurality of first packet error rates, and the condition is that values of the plurality of first packet error rates remain stable or decrease.

According to embodiments of this disclosure, the determining whether to change from the second state determines not to change from the second state to the first state based on the second packet error rate being less than the threshold e.

According to embodiments of this disclosure, the first state is the RTS/CTS disabled state, the second state is the RTS/CTS enabled state, the determining whether to change from the second state determines to change from the second state to the first state based on the second packet error rate being greater than or equal to the threshold, and the method further comprises changing from the RTS/CTS enabled state to the RTS/CTS disabled state in response to the determining to change from the second state, reducing a data rate, and re-measuring the first packet error rate, or the first state is the RTS/CTS enabled state, the second state is the RTS/CTS disabled state, the determining whether to change from the second state determines to change from the second state to the first state based on the second packet error rate being greater than or equal to the threshold, and the method further comprises changing from the RTS/CTS disabled state to the RTS/CTS enabled state in response to the determining to change from the second state, and re-measuring the first packet error rate.

According to embodiments of this disclosure, the method further includes re-measuring the first packet error rate in the first state in response to determining that the first packet error rate does not satisfy the condition.

According to embodiments of this disclosure, the first state is the RTS/CTS disabled state, and the condition is the first packet error rate being greater than the threshold, or the first state is the RTS/CTS enabled state, the first packet error rate is one of a plurality of first packet error rates, and the condition is that the plurality of first packet error rates remain stable or decrease.

According to embodiments of this disclosure, the threshold is a packet error rate tolerance at a current data rate.

According to embodiments of this disclosure, the method includes transmitting a data frame to a device while in the first state or the second state.

According to embodiments of this disclosure, a device for RTS/CTS adaptive enablement is provided, the device including processing circuitry configured to change a first state to a second state in response to determining that a first packet error rate satisfies a condition, the first packet error rate being measured in the first state, and each of the first state and the second state corresponding to a different one of an RTS/CTS enabled state and an RTS/CTS disabled state, and determine whether to change from the second state to the first state based on a second packet error rate and a threshold, the second packet error rate being measured in the second state.

According to embodiments of this disclosure, the processing circuitry is configured to measure the first packet error rate or the second packet error rate according to a time period.

According to embodiments of this disclosure, the first state is the RTS/CTS disabled state, to the second state is the RTS/CTS enabled state, and the condition is that the first packet error rate is greater than the threshold, or the first state is the RTS/CTS enabled state, the second state is the RTS/CTS disabled state, the first packet error rate is one of a plurality of first packet error rates, and the condition is that values of the plurality of first packet error rates remain stable or decrease.

According to embodiments of this disclosure, the processing circuitry is configured to determine not to change from the second state to the first state based on the second packet error rate being less than the threshold.

According to embodiments of this disclosure, the first state is the RTS/CTS disabled state, the second state is the RTS/CTS enabled state, and the processing circuitry is configured to change from the RTS/CTS enabled state to the RTS/CTS disabled state in response to determining the second packet error rate is greater than or equal to the threshold, reduce a data rate of the device, and re-measure the first packet error rate, or the first state is the RTS/CTS enabled state, the second state is the RTS/CTS disabled state, and the processing circuitry is configured to change from the RTS/CTS disabled state to the RTS/CTS enabled state in response to determining the second packet error rate is greater than or equal to the threshold, and re-measure the first packet error rate.

According to embodiments of this disclosure, the processing circuitry is configured to re-measure the first packet error rate in response to determining that the first packet error rate does not satisfy the condition.

According to embodiments of this disclosure, the first state is the RTS/CTS disabled state, and the condition is that the first packet error rate is greater than the threshold, or the first state is the RTS/CTS enabled state, the first packet error rate is one of a plurality of first packet error rates, and the condition is that the plurality of first packet error rates remain stable or decrease.

According to embodiments of this disclosure, the threshold is a packet error rate tolerance at a current data rate of the device.

According to embodiments of this disclosure, the processing circuitry is configured to transmit a data frame to another device in the first state or the second state.

According to embodiments this disclosure, an apparatus of RTS/CTS adaptive enablement is provided, the apparatus includes at least one processor, and a memory for storing a computer program that, when executed by the at least one processor, causes the apparatus to perform the method for RTS/CTS adaptive enablement.

According to embodiments of this disclosure, a non-transitory computer-readable storage medium storing a computer program that, when executed by at least one processor, causes the at least one processor to perform a method, the method including changing a first state to a second state in response to determining that a first packet error rate satisfies a condition, the first packet error rate being measured in the first state, each of the first state and the second state corresponds to a different one of an RTS/CTS enabled state and an RTS/CTS disabled state, and determining whether to change from the second state to the first state based on a second packet error rate and a threshold, the second packet error rate being measured in the second state.

The technical solutions provided according to embodiments of this disclosure bring at least the following beneficial effects: RTS/CTS may be adaptively enabled or disabled according to implementations of the scenarios, improving the utilization of wireless channel resources and increasing network communication throughput while reducing communication conflicts.

It should be understood that the above general description and the later detailed description are examples and explanatory only and do not limit the present disclosure.

4

BRIEF DESCRIPTION OF THE DRAWINGS

The accompanying drawings herein are incorporated into and form part of the specification, illustrate embodiments consistent with the disclosure, which are used in conjunction with the specification to explain the principles of the disclosure and do not constitute an undue limitation of the disclosure.

DETAILED DESCRIPTION

In order to enable a person of ordinary skill in the art to better understand the technical solutions of the disclosure, the technical solutions provide by embodiments of the disclosure will be clearly and completely described below in conjunction with the accompanying drawings.

It should be noted that the terms "first", "second", etc. in the specification and claims of the disclosure and the accompanying drawings above are used to distinguish similar objects rather than to describe a particular order or sequence. It should be understood that data so distinguished may be interchanged, where appropriate, so that embodiments of the disclosure described herein may be implemented in an order other than those illustrated or described herein. Embodiments described in the following examples do not represent all embodiments that are consistent with the disclosure. Rather, they are only examples of devices and methods that are consistent with some aspects of the disclosure, as detailed in the appended claims.

It should be noted herein that "at least one of the several items" in this disclosure includes "any one of the several items", "any combination of the several items" and "all of the several items" the juxtaposition of these three categories. For example, "including at least one of A and B" includes the following three juxtapositions: (1) including A; (2) including B; (3) including A and B. Another example is "performing at least one of operation one and operation two", which means the following three juxtapositions (1) performing operation one; (2) performing operation two; (3) performing operation one and operation two.

The IEEE 802.11 standard utilizes, for example, 2.4G and 5G spectrum, and the standard may extend to 6G spectrum in the future. In IEEE 802.11 wireless networks (e.g., WiFi networks), it includes multiple wireless links for the transmission of data packets. Since the transmission medium for multiple wireless links is a common area channel, in order to enable successful transmission of network link layer packets, wireless networks use a Carrier Listening Multiple Access/Conflict Avoidance (CSMA/CA) mechanism to control the use of links by nodes. However, the quality of wireless network communication can also be affected by hidden nodes in the network, and FIG. 1 illustrates a scenario where communication conflicts occur in the presence of hidden nodes.

Figure 1:
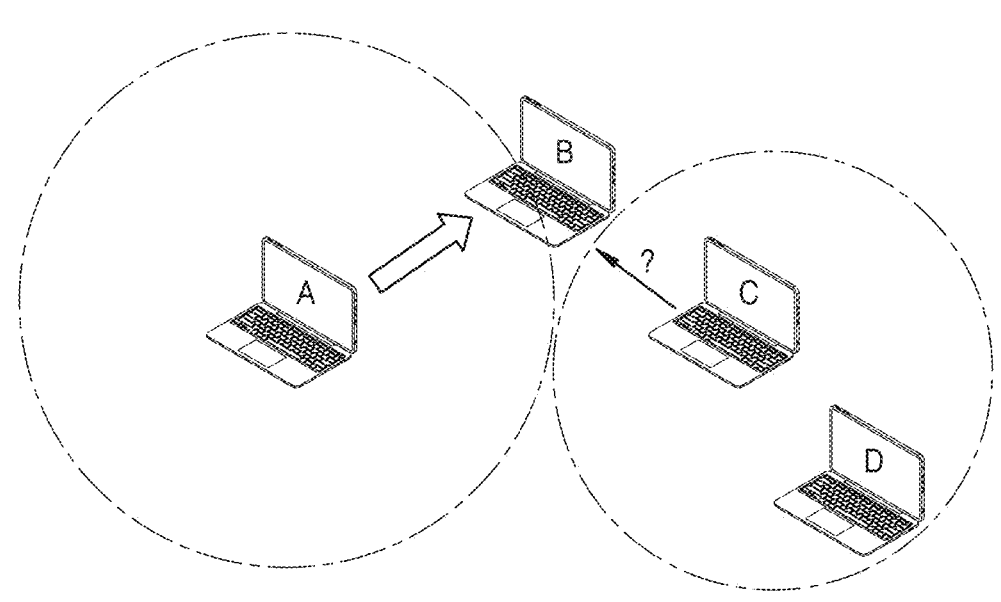
FIG. 1 illustrates a scenario where communication conflicts occur in the presence of hidden nodes.

As shown in FIG. 1, assuming that node A is transmitting data to node B while node C also wants to transmit data to node B. Since the distance of node C is beyond the carrier sensing range of node A, node A may not detect the existence of node C (node C is a hidden node of node A), and as a result, node A and node C to transmit packets to node B at the same time (or contemporaneously). In this way, packets will conflict and collide at node B. Node B is unable to recognize either the data from node A or the data from node C, which leads to higher failure rate for data transmitting and wastage of wireless channel resources.

Figure 2:
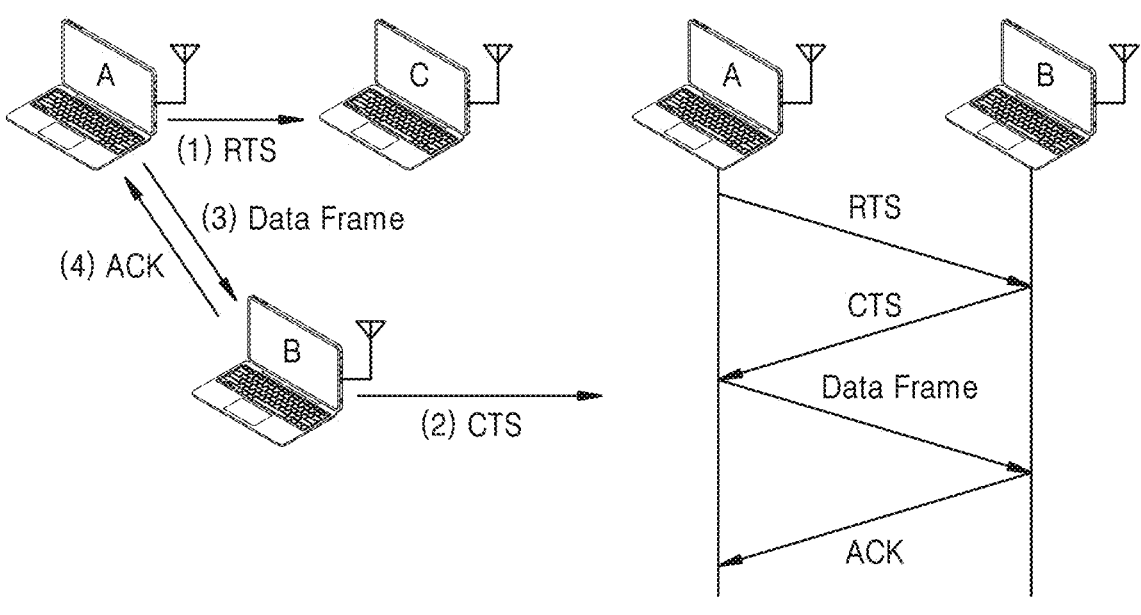
FIG. 2 illustrates the principle of the RTS/CTS mechanism.

To solve the problem of hidden nodes, the IEEE 802.11 standard defines an optional RTS/CTS mechanism to reserve the right to use the wireless link for the transmission of data frames between nodes (e.g., between node A and node B), and the principle of the RTS/CTS mechanism is illustrated in FIG. 2 below.

As shown in FIG. 2, node A has data frames to be transmitted to node B. First, it transmits an RTS control frame, which reserves the right (e.g., reserves a scheduled transmission time period) to use the wireless link (e.g., the wireless link between node A and node B) and requests other nodes receiving the RTS control frame to stop transmitting messages (e.g., during the scheduled transmission time period). Once the RTS frame is received by node B, node B replies with a CTS control frame, which reserves a wireless link channel for node A transmitting the RTS control frame and instructs the other nodes receiving the CTS control frame to keep silent (e.g., to avoid transmitting to node B during the scheduled transmission time period). At this point, node A, which receives the CTS control frame, may transmit data frames to node B without interference from hidden nodes (e.g., node C) until node B transmits an acknowledgement frame after receiving the data frames. After that, all nodes may sense and compete for the channel again.

Figure 3:
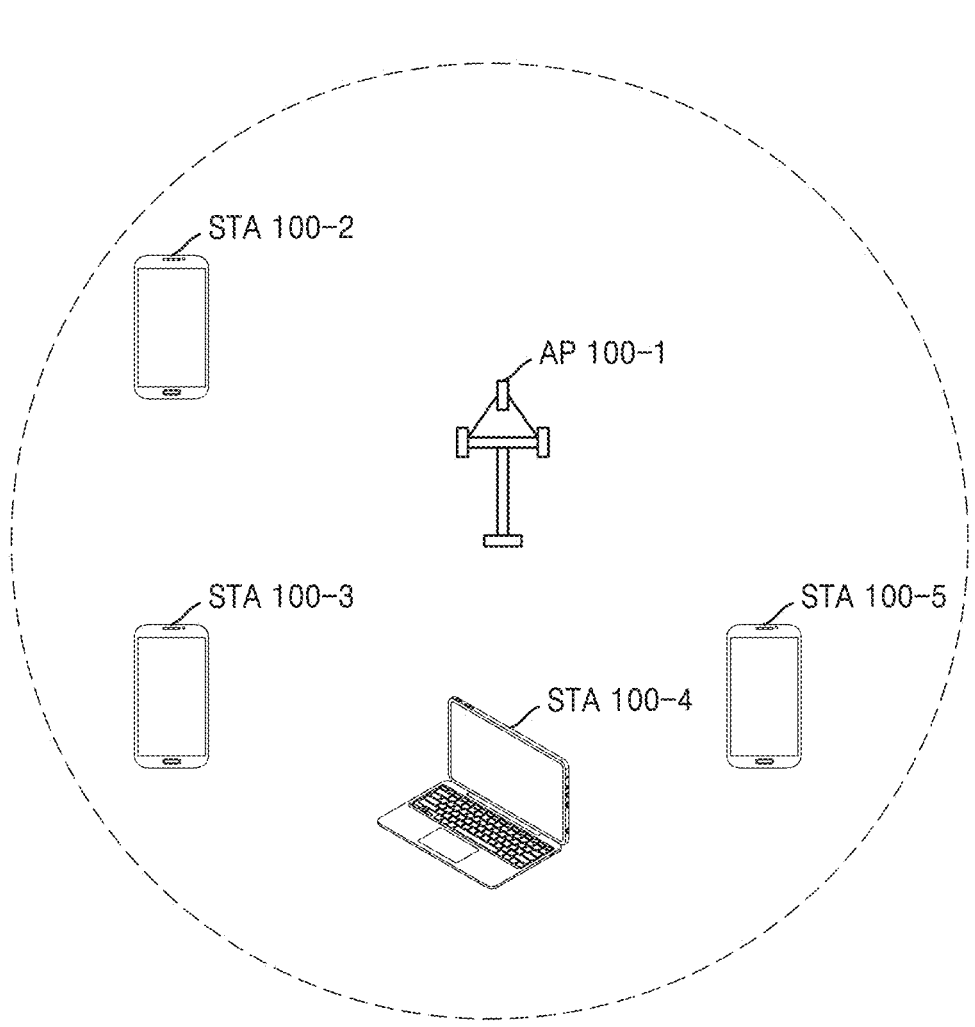
FIG. 3 illustrates a system environment of a method for RTS/CTS adaptive enablement/disablement according to embodiments of the disclosure.

FIG. 3 illustrates a system environment of a method for RTS/CTS adaptive enablement/disablement according to embodiments of the disclosure.

As shown in FIG. 3, the system environment of a method for RTS/CTS adaptive enablement/disablement may include nodes 100-1, 100-2 . . . 100-n (only 5 nodes are shown in the figure, e.g., a first node 100-1, a second node 100-2, a third node 100-3, a fourth node 100-4 and a fifth node 100-5). Here, nodes 100-1, 100-2 . . . 100-n may be apparatus with communication capabilities, including access points (APs) and/or stations (STAs). For example, the access point may be a NodeB, a wireless network controller (RNC), an eNodeB, a base station controller (BSC), a basic transceiver base station (BTS), a base station (BS), a transceiver function (TF), a wireless router, a wireless transceiver, a connection point, etc. Stations may be cell phones, tablets, desktops, laptops, handheld computers, notebooks, wearable apparatus (such as smart watches, smart bracelets, smart glasses, head-mounted displays (HMDs), etc.), net-books, personal digital assistants (PDAs), augmented reality (AR)/virtual reality (VR) apparatus, etc. In embodiments of the disclosure, the station (STA) may also be used as an access point (AP). Nodes 100-1, 100-2 . . . 100-n may access the network and communicate with each other via cellular communication networks (e.g., 4G networks, 5G networks, etc.) and other wireless networks (e.g., WLAN, Wi-Fi, and/or other networks that apply the IEEE 802.11 standard), etc. According to embodiments, the nodes 100-1, 100-2 . . . 100-n include transmitter and receiver and may communicate via the network(s) (e.g., the system environment) using one or more of various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, etc.

Figure 4A:
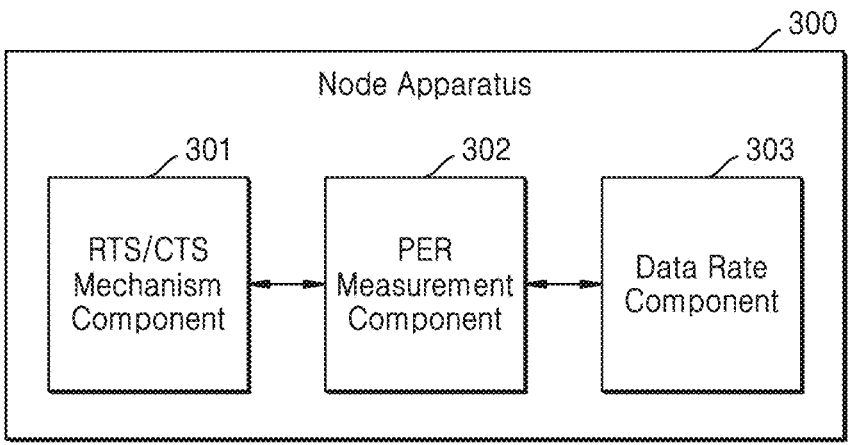
FIG. 4A illustrates a block diagram of a node apparatus and related components supporting the RTS/CTS mechanism according to embodiments of the disclosure.

FIG. 4A illustrates a block diagram of a node apparatus and related components supporting the RTS/CTS mechanism according to embodiments of the disclosure.

As shown in FIG. 4A, a node apparatus (e.g., node 300) in embodiments of the disclosure may include an RTS/CTS mechanism component 301, a Packet Error Rate (PER) measurement component (PER measurement component) 302 and/or a data rate component 303, wherein the RTS/CTS mechanism component 301 may perform an RTS/CTS function when enabled, the PER measurement component 302 may perform PER measurements and the data rate component 303 may perform a link adaptation algorithm. According to embodiments, node 300 may be implemented as one of nodes 100-1, 100-2 . . . 100-n.

PER measurements may be performed during data transmission. Apparatus implemented in accordance with the IEEE 802.11 standard support PER measurement, only the way to implement PER measurement is different among apparatus, and different operators may have different ways to implement PER measurement. In embodiments of the disclosure, PER measurement may be performed by, for example, transmitting a number of packets in a period, counting the number of packets that do not return an ACK, and calculating the PER as the ratio of the number of packets that do not return an ACK to the total number of packets transmitted in that period. Generally, the node apparatus in embodiments of the disclosure may measure PER in real time or at a higher frequency (the period of transmitting and counting packets is shorter), and the PER measurement function may always (e.g., continuously) run in the background. After measuring the PER, the node apparatus may select an appropriate data rate, and may increase or decrease the data rate to transmit data in consideration of the PER measurement results.

Generally, the node apparatus may select the appropriate data rate to transmit data according to the current environment. This feature may be implemented as a link adaptation algorithm. For example, in Orthogonal Frequency Division Multiplexing (OFDM) modulation mode, there are MCS7, MCS6 . . . , etc. representing different data rates available for node apparatus to choose. In general, different vendors may have different link adaptation algorithms. In embodiments of the disclosure, the link adaptation algorithm may set different PER tolerances for each data rate, for example, as shown in Table 1:

TABLE 1

| $V_1$ | $V_2$ | $V_3$ | . . . | $V_n$ |
|-------|-------|-------|-------|-------|
| $T_1$ | $T_2$ | $T_3$ | . . . | $T_n$ |

Assume that there are n (n being a positive integer) data rates $V_1$, $V_2$, $V_3$ . . . $V_n$ in an ascending order, which correspond to different PER tolerances $T_1$, $T_2$, $T_3$ . . . $T_n$. The tolerance values may be set, for example, according to the rule that the larger the data rate V, the smaller the tolerance. It should be understood that the setting of the tolerance value described above is only an example, and the disclosure does not limit this.

Figure 4B:
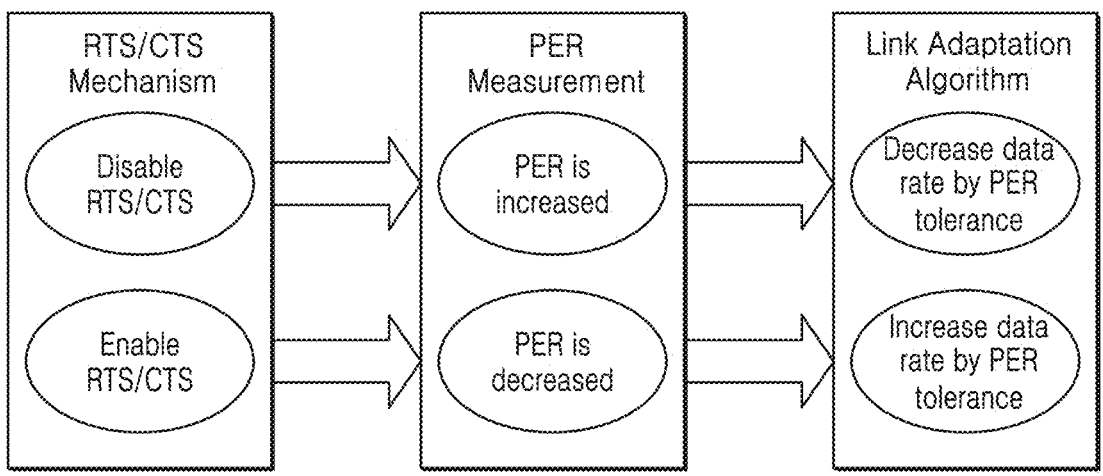
FIG. 4B illustrates an example of a process performed by the node apparatus supporting the RTS/CTS mechanism according to embodiments of the disclosure.

FIG. 4B illustrates an example of a process performed by the node apparatus supporting the RTS/CTS mechanism according to embodiments of the disclosure.

If the PER exceeds the PER tolerance of the current data rate, the data rate may be decreased. As shown in FIG. 4B, if the PER measurement (e.g., a measured value of the PER) increases and exceeds the PER tolerance of the current data rate after the RTS/CTS is disabled, the link adaptation algorithm may reduce the data rate, that is, the link adaptation algorithm may decrease the data rate by (e.g., according to) the PER tolerance. For example, if the current node 300 transmits data at the data rate $V_2$, and the measured PER is greater than the PER tolerance $T_2$ ($T_1$>$T_2$) at the data rate $V_2$, then the link adaptation algorithm may decrease the data rate to $V_1$. On the other hand, if the PER measurement decreases to be lower than the PER tolerance of adjacent higher data rate after the RTS/CTS is enabled, then the link adaptation algorithm may increase the data rate (to that higher data rate), that is, the link adaptation algorithm may increase the data rate by (e.g., according to) the PER tolerance. For example, if the current node 300 transmits data at the data rate $V_2$, and the measured PER acquired at this time is less than the PER tolerance $T_3$ ($T_2$>$T_3$) at the data rate $V_3$, then the link adaptation algorithm may increase the data rate to $V_3$.

It should be understood that the descriptions of the components related to the node apparatus supporting the RTS/CTS mechanism herein are only examples and the disclosure does not limit this.

Figure 5:
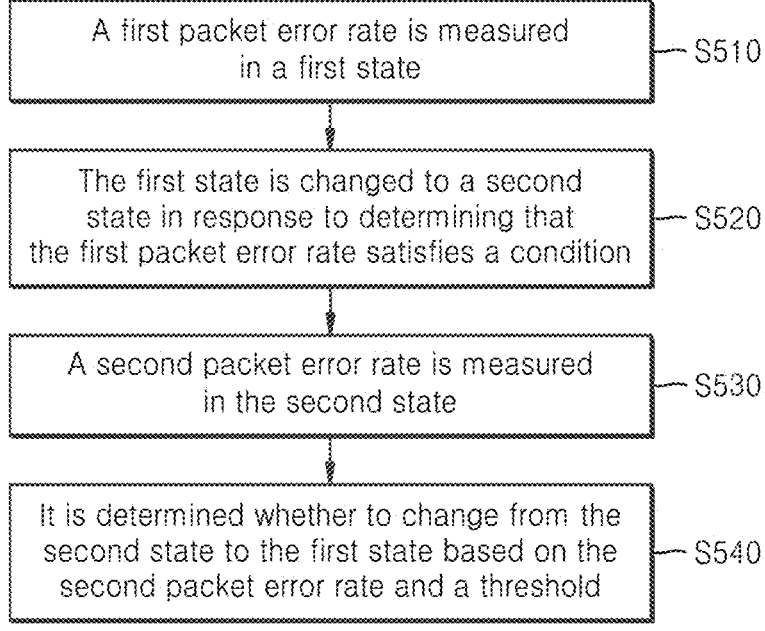
FIG. 5 illustrates a flowchart of a method for RTS/CTS adaptive enablement/disablement according to embodiments of the disclosure.

FIG. 5 illustrates a flowchart of a method for RTS/CTS adaptive enablement/disablement according to embodiments of the disclosure.

First, at operation S510, a first packet error rate is measured in a first state, wherein each of the first state and the second state corresponding to a different one of an RTS/CTS enabled state and an RTS/CTS disabled state, that is to say, the first state is one of an RTS/CTS enabled state and/or an RTS/CTS disabled state (e.g., the RTS/CTS enabled state), and the second state is the other (e.g., the RTS/CTS disabled state). In embodiments of the disclosure, the node 300 may continuously measure the packet error rate PER according to (e.g., at) a predetermined or alternatively, given time period, for example, the PER measurement component 302 in the node 300 may measure the PER at a higher frequency (shorter time period) or the PER measurement function may be always (e.g., continuously) running in real-time in the background. The node 300 may transmit a plurality packets in a predetermined or alternatively, given time period, count the number of packets that do not return an ACK, and then the PER may be calculated as the ratio of the number of packets that do not return an ACK to the total number of packets transmitted in that time period. Immediately (or promptly) afterwards, the node 300 may start the next predetermined or alternatively, given time period of PER measurement. For example, the predetermined or alternatively, given time period may be 100 ms (100 ms is only an example and the disclosure does not limit this).

In embodiments of the disclosure, a first packet error rate in the RTS/CTS disabled state may be acquired while node 300 is in the RTS/CTS disabled state, where the first packet error rate may be the most recent packet error rate acquired in the RTS/CTS disabled state after starting the present method procedure. In embodiments of the disclosure, a first packet error rate in the RTS/CTS enabled state may be acquired while the node 300 is in the RTS/CTS enabled state, where the first packet error rate may be one of a plurality of first packet error rates acquired in the RTS/CTS enabled state after starting the present method procedure.

Next, at operation S520, the first state may be changed to a second state in response to determining that the first packet error rate satisfies a (predetermined or alternatively, given) condition. The first state is the RTS/CTS disabled state, the second state is the RTS/CTS enabled state, and the condition is that the first packet error rate is greater than the threshold; or the first state is the RTS/CTS enabled state, the second state is the RTS/CTS disabled state, the first packet error rate is one of a plurality of first packet error rates, and the condition is that values of the plurality of first packet error rates remain stable or decrease. Specifically, in the case where the first state is the RTS/CTS disabled state, the RTS/CTS disabled state may be changed to the RTS/CTS enabled state in response to determining that the first packet error rate is greater than a threshold (e.g., a first threshold); in the case where the first state is the RTS/CTS enabled state, a first packet error rate being one of a plurality of first packet error rates may be acquired, and the RTS/CTS enabled state may be changed to the RTS/CTS disabled state in response to determining that the values of the plurality of first packet error rates remain stable or decrease.

In embodiments of the disclosure, the node 300 may continuously measure the packet error rate PER at a predetermined or alternatively, given time period. When the node 300 is in the RTS/CTS disabled state, a first packet error rate in the RTS/CTS disabled state may be acquired, where the first packet error rate may be a PER individual (e.g., single) measurement value in the RTS/CTS disabled state. If the PER individual measurement value increases and exceeds the threshold, it may indicate that the node 300 is in an interference environment where there are many hidden nodes and packet transmissions are conflicting, resulting in a higher data transmitting failure rate, and thus node 300 may attempt to enable RTS/CTS (changing the RTS/CTS disabled state to RTS/CTS enabled state). The threshold may be the PER predefined or alternatively, given tolerance of the current data rate (set PER tolerance value). If the PER increases and exceeds the PER predetermined (or alternatively, given) tolerance of the current data rate, the node 300 may enter the link adaptation algorithm procedure, where the data rate component 303 may reduce the data rate of the node 300. Node 300 may enable RTS/CTS in an attempt to improve the PER prior to reducing the data rate.

In embodiments of the disclosure, the node 300 may continuously measure the packet error rate PER at a predetermined or alternatively, given time period. When node 300 is in the RTS/CTS enabled state, a first packet error rate in the RTS/CTS enabled state may be acquired, where the first packet error rate may be one of a plurality of PER measurement values in the RTS/CTS enabled state. If the plurality of PER measurement values remain stable or decrease, this may indicate that node 300 is in a clean environment with fewer hidden nodes, RTS/CTS enablement may cause an increase in time (e.g., communication delay) and power consumption, and thus node 300 may attempt to disable RTS/CTS (change RTS/CTS enable state to RTS/CTS disable state). Here the plurality of PER measurement values remaining stable may refer to the plurality of PER measurements (e.g., 3 or 5, which are not limited by the present disclosure) remain the same value, a similar value, or fluctuate in a smaller range (e.g., a set range). The plurality of PER measurement values decreasing may refer to a decreasing trend of the plurality of PER measurement values.

Figure 6:
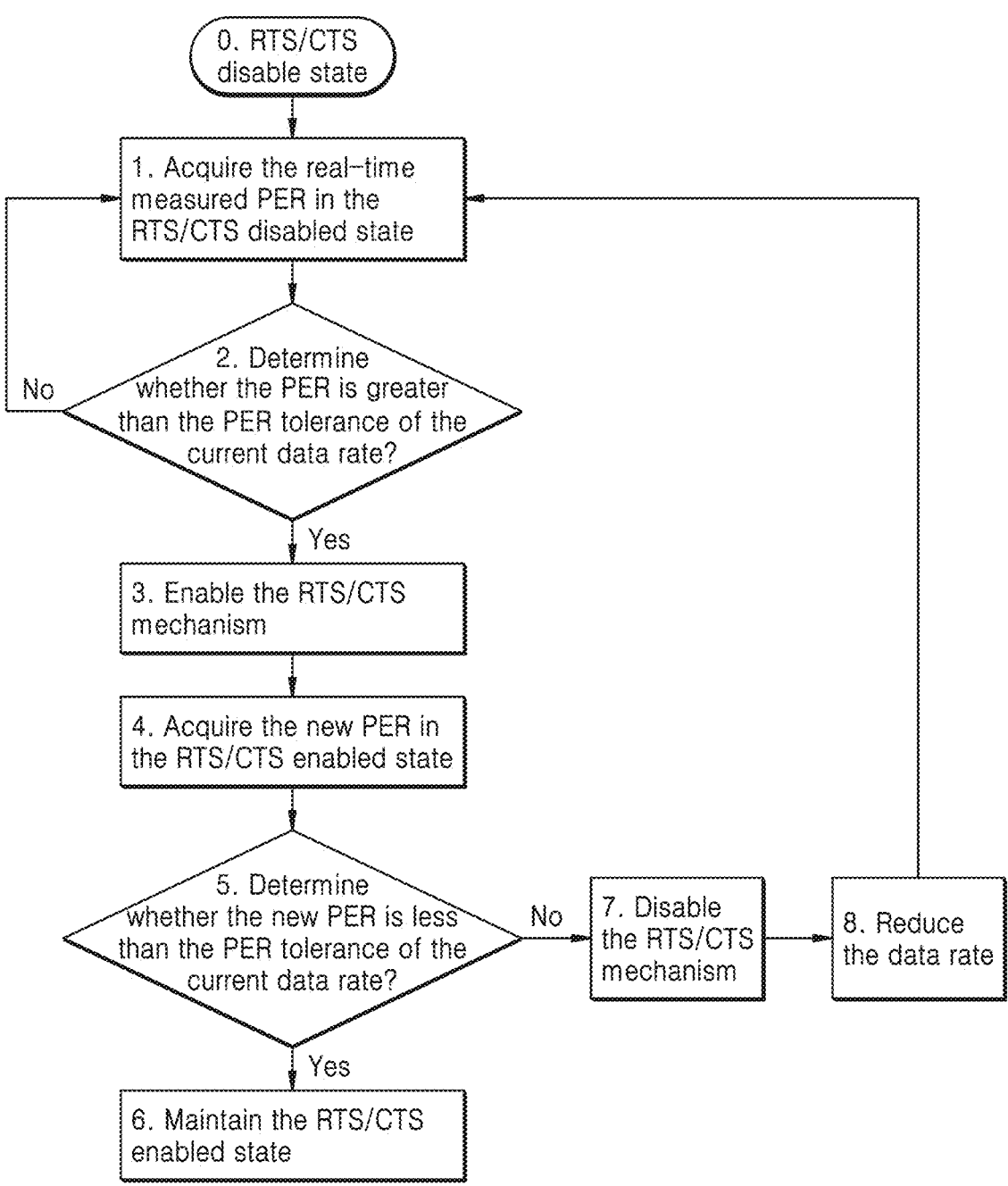
FIG. 6 illustrates a flowchart of adaptively enabling RTS/CTS in the RTS/CTS disabled state according to embodiments of the disclosure.
Figure 7:
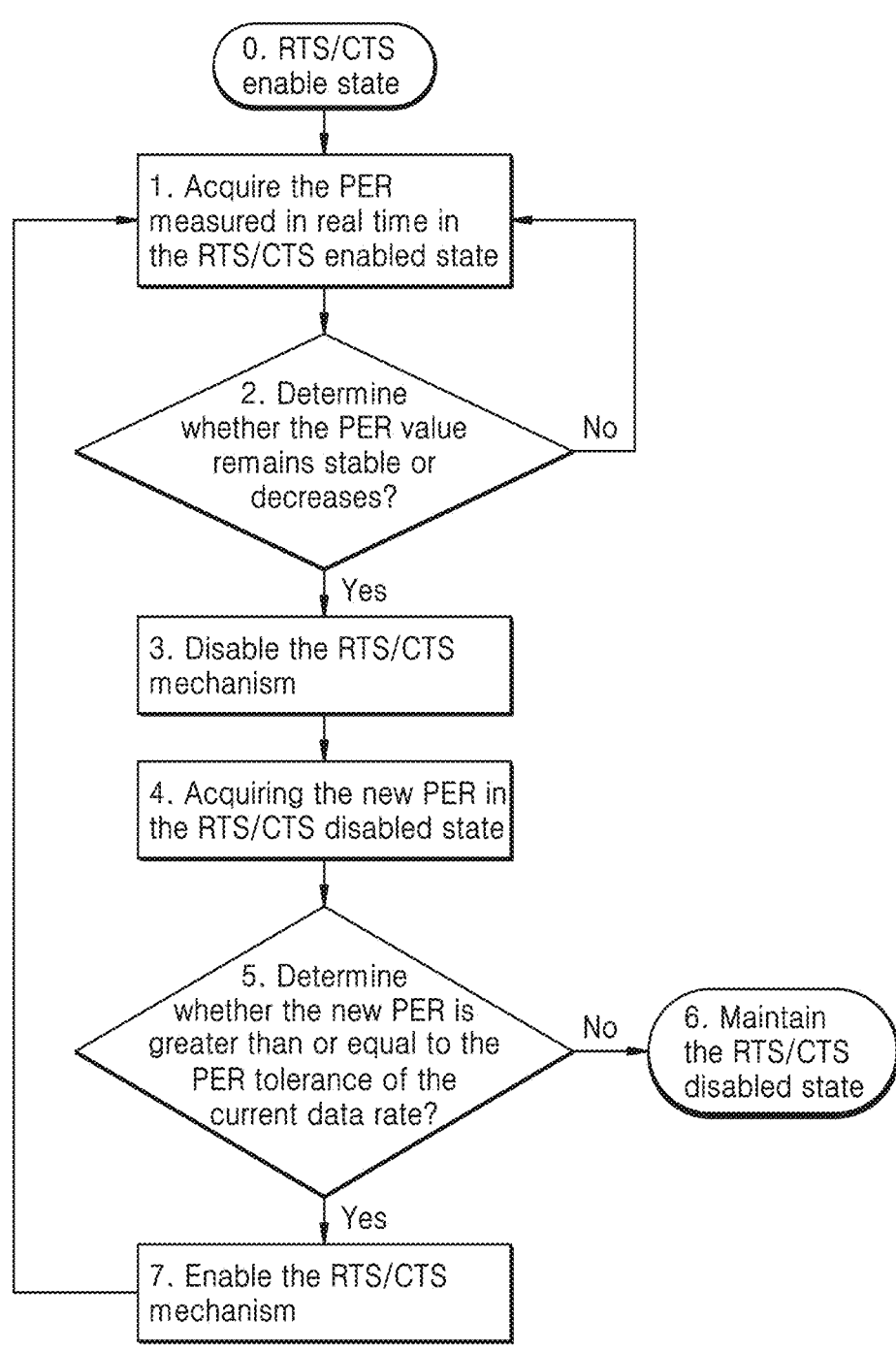
FIG. 7 illustrates a flowchart of adaptively disabling RTS/CTS in the RTS/CTS enabled state according to embodiments of the disclosure.

On the other hand, in response to determining that the first packet error rate does not satisfy the (predetermined or alternatively, given) condition, the first packet error rate in the first state may be re-measured, that is to say, the first state may be maintained and the process may return to the operation of measuring the first packet error rate (see the discussion of FIGS. 6-7 for further examples of this process). Specifically, in the case where the first state is the RTS/CTS disabled state, in response to determining that the first packet error rate is less than or equal to a threshold, the RTS/CTS disabled state may be maintained and the process may return to the operation of measuring the first packet error rate; in the case where the first state is the RTS/CTS enabled state, the acquired first packet error rate may be one of a plurality of first packet error rates, in response to determining that the plurality of first packet error rates do not remain stable or decrease, the RTS/CTS enabled state may be maintained and the process may return to the operation of measuring the first packet error rate.

In embodiments of the disclosure, the first packet error rate in the RTS/CTS disabled state may be acquired when the node 300 is in the RTS/CTS disabled state, where the first packet error rate may be a PER individual measurement value in the RTS/CTS disabled state. If the PER individual measurement value is less than or equal to the threshold, where the threshold may be the predefined or alternatively, given PER tolerance of the current data rate (set PER tolerance value), the node 300 may not enter the link adaptation algorithm procedure to reduce the data rate of the node 300, and the PER measurement value may have a smaller impact on the node data rate which is still within the tolerance range. Then, the node 300 may maintain the RTS/CTS disabled state and continue to acquire the packet error rate measured in the RTS/CTS disabled state (returning to the operation of measuring the first packet error rate).

In embodiments of the disclosure, when the node 300 is in the RTS/CTS enabled state, the first packet error rate in the RTS/CTS enabled state may be acquired, where the first packet error rate may be one of a plurality of PER measurement values in the RTS/CTS enabled state. If the plurality of PER measurement values do not remain stable or decrease, then the node 300 may be in an environment that may have hidden nodes and the RTS/CTS mechanism may be useful to improve transmission. Then, the node 300 may maintain the RTS/CTS enabled state and continue to acquire the packet error rate in the RTS/CTS enabled state (returning to the operation of measuring the first packet error rate).

Next, at operation S530, a second packet error rate is measured in the second state. In embodiments of disclosure, the node 300, with the first state being the RTS/CTS disabled state, may attempt to change the RTS/CTS disabled state to the RTS/CTS enabled state to acquire the second packet error rate measured in the RTS/CTS enabled state (the second state), where the second packet error rate may be a PER individual measurement value in the RTS/CTS enabled state. In embodiments of the disclosure, the node 300, with the first state being the RTS/CTS enabled state, may attempt to change the RTS/CTS enabled state to the RTS/CTS disabled state to acquire the second packet error rate measured in the RTS/CTS disabled state (the second state), where the second packet error rate may be a PER individual measurement value in the RTS/CTS disabled state.

Then, at operation S540, node 300 may determine whether to change from the second state to the first state based on the second packet error rate and a threshold (e.g., a second threshold). According to embodiments, the second threshold may be the same as or similar to the first threshold discussed in connection with operation S520. Further, it is determined not to change from the second state to the first state based on the second packet error rate being less than the threshold. Specifically, in the case of changing the RTS/CTS disabled state to the RTS/CTS enabled state, if the second packet error rate is less than the threshold value, the RTS/CTS enabled state may be maintained; in the case of changing the RTS/CTS enabled state to the RTS/CTS disabled state, if the second packet error rate is less than the threshold, the RTS/CTS disabled state may be maintained. In addition, the first state is the RTS/CTS disabled state, the second state is the RTS/CTS enabled state, it is determined to change from the second state to the first state based on the second packet error rate being greater than or equal to the threshold. Changing from the RTS/CTS enabled state to the RTS/CTS disabled state is performed in response to the determining to change from the second state, a data rate may be reduced, and the first packet error rate may be re-measured. Or the first state is the RTS/CTS enabled state, the second state is the RTS/CTS disabled state, it is determined to change from the second state to the first state may based on the second packet error rate being greater than or equal to the threshold. Changing from the RTS/CTS disabled state to the RTS/CTS enabled state is performed in response to the determining to change from the second state, and the first packet error rate may be re-measured. Specifically, in the case of changing the RTS/CTS disabled state to the RTS/CTS enabled state, if the second packet error rate is greater than or equal to the threshold, the RTS/CTS enabled state may be changed to the RTS/CTS disabled state, the data rate may be reduced and the procedure may return to the operation of measuring the first packet error rate (e.g., operation S510); in the case of changing the RTS/CTS enabled state to the RTS/CTS disabled state, if the second packet error rate is greater than or equal to the threshold, the RTS/CTS disabled state may be changed to the RTS/CTS enabled state and the procedure may return to the operation of measuring the first packet error rate (e.g., operation S510).

In embodiments of the disclosure, the threshold involved in the comparison may be the predetermined or alternatively, given PER tolerance of the current data rate. The node 300 may attempt to change the RTS/CTS disabled state to the RTS/CTS enabled state to acquire a second packet error rate measured in the RTS/CTS enabled state, where the second packet error rate may be a PER individual measurement value in the RTS/CTS enabled state. If the second packet error rate is less than the threshold, it may indicate that the enablement of RTS/CTS mechanism has improved the packet transmission in the current environment, and the data transmission failure (or likelihood of data transmission failure) is reduced, which effectively solves (or reduces) the hidden node challenge. Then, the node 300 may maintain the RTS/CTS enabled state without reducing the data rate, which ensures (or improves) the efficiency of data transmission. However, if the second packet error rate is greater than or equal to the threshold, it may indicate that the RTS/CTS mechanism enablement is not as helpful for packet transmission in the current environment, and continuation of the enablement may only increase the delay and power consumption. Then the node 300 may change from the RTS/CTS enabled state to the RTS/CTS disabled state, and the node 300 may enter the normal link adaptation algorithm procedure, and the data rate component 303 may reduce the rate of the node 300. The node 300 may continue to acquire the packet error rate measured in the RTS/CTS disabled state (returning to the operation of measuring the first packet error rate).

In embodiments of the present disclosure, the threshold involved in the comparison may be the predetermined or alternatively, given PER tolerance of the current data rate. The node 300 may attempt to change the RTS/CTS enabled state to the RTS/CTS disabled state to acquire a second packet error rate measured in the RTS/CTS disabled state, where the second packet error rate may be a PER individual measurement value in the RTS/CTS disabled state. If the second packet error rate is less than the threshold, it may indicate that the node 300 is not interfered by the hidden node and enablement of the RTS/CTS mechanism may only increase the latency and power consumption, then the node 300 may remain in the RTS/CTS disabled state. However, if the second packet error rate is greater than or equal to the threshold, indicating that there is interference from hidden nodes in the current environment and packet transmissions are conflicting, resulting in a higher data transmitting failure rate, then the node 300 may change from the RTS/CTS disabled state to the RTS/CTS enabled state. The node 300 may continue to acquire the packet error rate measured in the RTS/CTS enabled state (returning to the operation of measuring the first packet error rate).

As described above, the method for RTS/CTS adaptive enablement/disablement according to embodiments may adaptively enable or disable RTS/CTS according to various scenarios, improving the utilization of wireless channel resources and/or increasing network communication throughput while reducing communication conflicts.

The flowchart of adaptively enabling RTS/CTS when the initial state is RTS/CTS disabled state will be illustrated in detail below with reference to FIG. 6, and the flowchart of adaptively disabling RTS/CTS when the initial state is RTS/CTS enabled state will be illustrated in detail with reference to FIG. 7. According to embodiments, the method of setting the initial state of node 300 may include, but is not limited to, the following cases:

1) Direct setting, in which the initial state of node 300 may be set directly to the RTS/CTS disable state or the RTS/CTS enable state.

2) Setting based on the measured RSSI value, in which the initial state of node 300 may be set based on the measured RSSI of the received signal. For example, if the RSSI is greater than a certain threshold, the initial state of node 300 is set to RTS/CTS disabled state, otherwise it is set to RTS/CTS enabled state.

3) Setting based on the packet size. For example, if the packet size of the packet to be transmitted by node 300 is less than a certain threshold, the initial state is set to RTS/CTS disabled state, otherwise it is set to RTS/CTS enabled state.

FIG. 6 illustrates a flowchart of adaptively enabling RTS/CTS in the RTS/CTS disabled state according to embodiments of the disclosure, as shown in FIG. 6.

Operation 0: RTS/CTS disable state. At this time, the node 300 may transmit data without RTS/CTS protection and conflicts in data transmission may occur. According to embodiments, the procedure discussed in connection with FIG. 6 may refer to a procedure performed by the node 300 in a scenario in which one or more packets to be transmitted are smaller in size (e.g., smaller than an RTS/CTS threshold size), and thus, the node 300 is initially in the RTS/CTS disable state.

Operation 1: Acquire the real-time measured PER in the RTS/CTS disabled state. The node 300 may measure the packet error rate PER in real time (with a predetermined or alternatively, given time period), and the PER measurement function of the node 300 may always run in the background. At this time, the node may acquire the real-time measured PER in the RTS/CTS disabled state, and the PER may be a single PER.

Operation 2: Determine whether the PER is greater than the predetermined or alternatively, given PER tolerance of the current data rate (e.g., a first threshold). If so ("yes"), this may indicate that the node 300 is in an interference environment where there are many hidden nodes, resulting in a high data transmitting failure rate. The node 300 may enter the link adaptation algorithm procedure to reduce the rate of the node 300 by the data rate component 303. And the procedure may advance to operation 3 before entering the link adaptation algorithm. If not ("no"), the PER measurement value at this time may have a small impact on the node data rate which is still within the tolerance range, and the node 300 may remain in the RTS/CTS disabled state. Or, if the PER has only increased but is not yet greater than the PER tolerance for the current data rate, the data rate of the node may not be reduced. The impact of the PER on the data rate is still smaller and the RTS/CTS mechanism may not be enabled, and thus the procedure may return to operation 1 to continue to acquire the PER measured in the RTS/CTS disabled state.

Operation 3: Enable the RTS/CTS mechanism. The node may change from the RTS/CTS disabled state to the RTS/CTS enabled state.

Operation 4: Acquire the new PER in the RTS/CTS enabled state. Since the node 300 measures the packet error rate PER in real time (with a predetermined or alternatively, given time period), the PER measurement function of node 300 may always run in the background. At this point, the node may acquire the new PER in the RTS/CTS enabled state.

Operation 5: Determine whether the new PER is less than the predetermined or alternatively, given PER tolerance of the current data rate (e.g., a second threshold). If so ("yes"), it may indicate that the RTS/CTS mechanism has effectively reduced the data transmission failure and solved (or mitigated) the hidden node challenge, and the procedure may advance to operation 6. If not ("no"), that is, the new PER is greater than or equal to the predefined (or alternatively, given) PER tolerance of the current data rate, it may indicate that the RTS/CTS mechanism is not sufficiently helpful for the packet transmission in the current environment, and continuation of enablement may only increase the latency and power consumption, then the procedure may advance to operation 7. According to embodiments, the first threshold and the second threshold may be the same or similar (both the first threshold and the second threshold may be referred to herein as the PER threshold). The node 300 may store a table (see, e.g., Table 1 above) in a memory (such as the at least one memory 910 discussed below), the table indicating associations between data rates (e.g., data rate limits, data rate intervals, etc.) and corresponding PER tolerances (e.g., PER tolerance limits, PER tolerance intervals, etc.). To determine the PER threshold, the node 300 may determine the data rate in the table corresponding to the current data rate of the node 300 and determine the PER tolerance associated with the determined data rate. The PER threshold may correspond to (e.g., be equal to) the determined PER tolerance.

Operation 6: Maintain the RTS/CTS enabled state. At this point, the node 300 may enter the RTS/CTS enabled state, and subsequent data transmission may be under RTS/CTS protection. According to embodiments, the node 300 may generate and/or transmit data (e.g., a data frame) to another device (e.g., a mobile device, access point, etc.) in the RTS/CTS enabled state in operation 6. And the node 300 may transfer to the procedure of FIG. 7 below.

Operation 7: Disable the RTS/CTS mechanism. Subsequent data transmission may not be under RTS/CTS protection as the initial state.

Operation 8: Reduce the data rate. The node 300 may disable the RTS/CTS mechanism. Since the PER in the RTS/CTS disabled state may exceed the threshold, the node 300 may enter the normal link adaptation algorithm procedure and the data rate component 303 may reduce the data rate of the node 300. At this point, the node state may be the same as (or similar to) the initial state and the procedure may returns to operation 1 again to acquire the PER measured in the RTS/CTS disabled state, and the entire procedure may become a loop. According to embodiments, the node 300 may generate and/or transmit data (e.g., a data frame) to another device (e.g., a mobile device, access point, etc.) in the RTS/CTS disabled state in operation 8.

As described above, the method for RTS/CTS adaptive enablement according to embodiments may adaptively enable RTS/CTS according to various scenarios, improving the utilization of wireless channel resources and/or increasing network communication throughput while reducing communication conflicts.

FIG. 7 illustrates a flowchart of adaptively disabling RTS/CTS in the RTS/CTS enabled state according to embodiments of the disclosure.

Operation 0: RTS/CTS enabled state. At this point, the node 300 may transmit data with RTS/CTS protection. According to embodiments, the procedure discussed in connection with FIG. 7 may refer to a procedure performed in a scenario in which one or more packets to be transmitted are larger in size (e.g., larger than an RTS/CTS threshold size), and thus, the node 300 is initially in the RTS/CTS enable state.

Operation 1: Acquire the PER measured in real time in the RTS/CTS enabled state. The node 300 may measure the packet error rate PER in real time (with a predetermined or alternatively, given time period), and the PER measurement function of node 300 may always run in the background. At this time, the node may acquire a plurality of PERs measured in real time in the RTS/CTS enabled state.

Operation 2: Determine whether the PER value remains stable or decreases. Here, that the node 300 may periodically check whether the PER measurement results remain stable or decrease, and the interval of the periodic checks may be set as desired, for example, it may be set to a longer interval. It may be determined whether the PER has remained stable or decreased over a recent period of time based on the plurality of PER values acquired. If so ("yes"), it may indicate that node 300 may be in a clean environment with fewer hidden nodes, while avoiding PER jitter (variation between large and small) caused by environmental factors which may cause misjudgment in subsequent operations, and the procedure may advance to operation 3. If not ("no"), the node 300 may be in an environment having hidden nodes, while PER jitter may cause misjudgment in subsequent operations, and thus the procedure may return to operation 1 to continue acquiring the PER measured in the RTS/CTS enabled state.

Operation 3: Disable the RTS/CTS mechanism. The node may change from the RTS/CTS enabled state to the RTS/CTS disabled state.

Operation 4: Acquiring the new PER in the RTS/CTS disabled state. Since the node 300 may measure the packet error rate PER in real time (with a predetermined or alternatively given time period), the PER measurement function of node 300 may always run in the background. At this point, the node may acquire the new PER in the RTS/CTS disabled state.

Operation 5: Determine whether the new PER is greater than or equal to the predetermined (or alternatively, given) PER tolerance of the current data rate (e.g., a PER threshold). If not ("no"), it may indicate that node 300 is not interfered with by hidden nodes and enabling the RTS/CTS mechanism may only increase the latency and power consumption, and the procedure may advance to operation 6. If yes ("yes"), it may indicate that there is interference from hidden nodes in the current environment and packet transmission is in conflict, resulting in a higher failure rate of data transmission, and the procedure may advance to operation 7. According to embodiments, the node 300 may store a table (see, e.g., Table 1 above) in a memory (such as the at least one memory 910 discussed below), the table indicating associations between data rates (e.g., data rate limits, data rate intervals, etc.) and corresponding PER tolerances (e.g., PER tolerance limits, PER tolerance intervals, etc.). To determine the PER threshold, the node 300 may determine the data rate in the table corresponding to the current data rate of the node 300 and determine the PER tolerance associated with the determined data rate. The PER threshold may correspond to (e.g., be equal to) the determined PER tolerance.

Operation 6: Maintain the RTS/CTS disabled state. At this point, the node 300 may enter the RTS/CTS disabled state and the subsequent data transmission may not have RTS/CTS protection. According to embodiments, the node 300 may generate and/or transmit data (e.g., a data frame) to another device (e.g., a mobile device, access point, etc.) in the RTS/CTS disabled state in operation 6. And the node 300 may transfer to the procedure of FIG. 6 described above.

Operation 7: Enable the RTS/CTS mechanism. The subsequent data transmission may be under RTS/CTS protection, at which point the node state is the same as (or similar to) the initial state. The procedure may return to operation 1 again to acquire the PER measured in the RTS/CTS enabled state, and the entire procedure may become a loop. According to embodiments, the node 300 may generate and/or transmit data (e.g., a data frame) to another device (e.g., a mobile device, access point, etc.) in the RTS/CTS enabled state in operation 7.

As described above, the method for RTS/CTS adaptive disablement according to embodiments may adaptively disable RTS/CTS according to various scenarios, improving the utilization of wireless channel resources and/or increasing network communication throughput while reducing communication conflicts.

Figure 8:
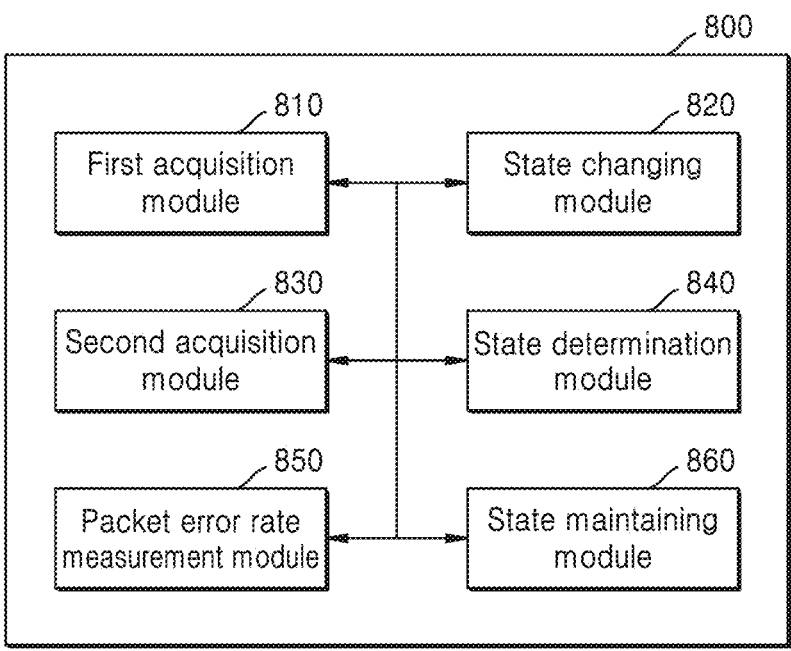
FIG. 8 illustrates a block diagram of a device for RTS/CTS adaptive enablement/disablement according to embodiments of the disclosure.

FIG. 8 illustrates a block diagram of a device for RTS/CTS adaptive enablement/disablement according to embodiments of the disclosure.

As shown in FIG. 8, a device 800 (e.g., may be implemented using, or used to implement, the node 300) for RTS/CTS adaptive enablement/disablement may comprise: a first acquisition module 810, a state changing module 820, a second acquisition module 830 and/or a state determination module 840, wherein the first acquisition module 810 may acquire a first packet error rate measured in a first state; the state changing module 820 may change the first state to a second state in response to determining that the first packet error rate acquired in the first state satisfies a predetermined or alternatively, given condition; the second acquisition module 830 may acquire a second packet error rate measured in the second state; the state determination module 840 may determine whether to maintain the second state or to change from the second state to the first state based on the result of comparison between the second packet error rate and a threshold.

According to embodiments, the device 800 for RTS/CTS adaptive enablement/disablement may further comprise a packet error rate measurement module 850, the packet error rate measurement module 850 may continuously measure a packet error rate according to (e.g., at) a predetermined or alternatively, given time period.

According to embodiments, in the case where the first state is the RTS/CTS disabled state, the state changing module 820 may change the RTS/CTS disabled state to the RTS/CTS enabled state in response to determining that the first packet error rate is greater than a threshold. In the case where the first state is the RTS/CTS enabled state, the state changing module 820 may acquire a first packet error rate including a plurality of packet error rates, and change the RTS/CTS enabled state to the RTS/CTS disabled state in response to determining that the values of the plurality of packet error rates included in the first packet error rate remain stable or decrease.

According to embodiments, in the case of changing the RTS/CTS disabled state to the RTS/CTS enabled state, if the second packet error rate is less than a threshold, the state determination module 840 may maintain the RTS/CTS enabled state. In the case of changing the RTS/CTS enabled state to the RTS/CTS disabled state, if the second packet error rate is less than the threshold, the state determination module 840 may maintain the RTS/CTS disabled state.

According to embodiments, in the case of changing the RTS/CTS disabled state to the RTS/CTS enabled state, if the second packet error rate is greater than or equal to the threshold, the state determination module 840 may change from the RTS/CTS enabled state to the RTS/CTS disabled state, reduce the data rate and return to the operation of acquiring the first packet error rate in the first acquisition module 801. In the case of changing the RTS/CTS enabled state to the RTS/CTS disabled state, if the second packet error rate is greater than or equal to the threshold, the state determination module 840 may change from the RTS/CTS disabled state to the RTS/CTS enabled state and return to the operation of acquiring the first packet error rate in the first acquisition module 801.

According to embodiments, the device 800 for RTS/CTS adaptive enablement/disablement may further comprise a state maintaining module 860. The state maintaining module 860 may, in response to determining that the first packet error rate in the first state does not satisfy the predetermined (or alternatively, given) condition, maintain the first state and return to the operation of acquiring the first packet error rate in the first acquisition module 801. Further, the state maintaining module 860 may, in the case where the first state is the RTS/CTS disabled state, maintain the RTS/CTS disabled state and return to the operation of acquiring the first packet error rate in the first acquisition module 801 in response to determining that the first packet error rate is less than or equal to a threshold. In the case where the first state is the RTS/CTS enabled state, and the acquired first packet error rate includes a plurality of packet error rates, the state maintaining module 860 may maintain the RTS/CTS enabled state and return to the operation of acquiring the first packet error rate in the first acquisition module 801 in response to determining that the plurality of packet error rates included in the first packet error rate do not remain stable or decrease.

According to embodiments, wherein the threshold is a predetermined or alternatively, given tolerance for the packet error rate at the current data rate.

Figure 9:
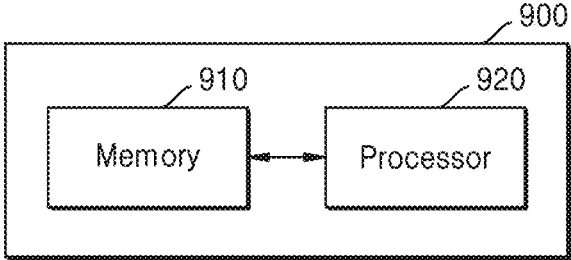
FIG. 9 illustrates a block diagram of an electronic device according to embodiments of the disclosure.

FIG. 9 illustrates a block diagram of an electronic device according to embodiments. The electronic device 900 may be a node 100-1, 100-2 . . . 100-n, and/or the node 300 (e.g., may be implemented using, or used to implement, the node 300 and/or the device 800), of embodiments of the disclosure. Referring to FIG. 9, the electronic device 900 may include at least one memory 910 and/or at least one processor 920. The at least one memory may store a set of computer executable instructions therein, and when a set of computer-executable instructions (e.g., the set of computer executable instructions stored in the at least one memory 910) is executed by the at least one processor, a method for RTS/CTS adaptive enablement/disablement according to embodiments of the present disclosure may be executed.

Here, the electronic device may not be a single electronic device, but may also be any collection of devices or circuits capable of executing the instructions (or instruction set) individually or in combination. The electronic device may also be part of an integrated control system or system manager, or may be configured to be a electronic device connecting local or remote (e.g., via wireless transmission) with an interface.

In an electronic device, the processor may include a central processing unit (CPU), a graphic processing unit (GPU), a programmable logic device, a dedicated processor system, a microcontroller, and/or a microprocessor. As an example and not a limitation, a processor may also include an analog processor, a digital processor, a microprocessor, a multi-core processor, a processor array, a network processor, and/or the like.

The processor may run instructions or code stored in the memory, wherein the memory may also store data. The instructions and/or data may also be sent, and/or received, over a network via a network interface device, wherein the network interface device may employ any known transmission protocol.

The memory may be integrated with the processor, for example, by arranging RAM or flash memory within an integrated circuit microprocessor. In addition, the memory may comprise a separate device, such as an external disk drive, a storage array, or any other storage device that may be used by the database system. The memory and the processor may be operationally coupled or may communicate with each other, for example, via I/O ports, network connections, etc., so that the processor may read the files stored in the memory.

In addition, the electronic device may also include a video display (e.g., LCD) and a user interaction interface (such as a keyboard, mouse, touch input device, etc.). All components of the electronic device may be connected to each other via a bus and/or network.

According to embodiments of the disclosure, a computer-readable storage medium may also be provided, wherein a computer program is stored thereon, the program when executed may implement a method for RTS/CTS adaptive enablement/disablement according to the present disclosure. Examples of computer-readable storage media herein include: read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk memory, hard disk drive (HDD), solid state drive (SSD), card-based memory (such as, multimedia cards, Secure Digital (SD) cards and/or Extreme Digital (XD) cards), magnetic tapes, floppy disks, magneto-optical data storage devices, optical data storage devices, hard disks, solid state disks, and/or any other device, where the other device is configured to store the computer programs and any associated data, data files, and/or data structures in a non-transitory manner and to provide the computer programs and any associated data, data files, and/or data structures to a processor or computer, so that the processor or computer may execute the computer program. The computer program in the computer readable storage medium may run in an environment deployed in a computer device such as a terminal, client, host, agent, server, etc., and furthermore, in one example, the computer program and any associated data, data files and/or data structures are distributed on a networked computer system such that the computer program and any associated data, data files and/or data structures are stored, accessed, and/or executed in a distributed manner by one or more processors or computers.

The method, device, apparatus, and readable storage medium for RTS/CTS adaptive enablement/disablement according to embodiments of the disclosure facilitates RTS/CTS adaptive enablement/disablement according to various scenarios, improving the utilization of wireless channel resources and/or increasing network communication throughput while reducing communication conflicts.

Conventional devices implementing an RTS/CTS mechanism enable RTS/CTS when a packet size to be transmitted exceeds a threshold. However, in a first scenario in which smaller packets are transmitted in an environment with higher interference caused by a higher number of hidden nodes, the conventional devices disable RTS/CTS based on the smaller packet size. Accordingly, the conventional devices suffer excessive rates of data transmission failure in this first scenario, resulting in decreased data rates and throughput. Also, in a second scenario in which larger packets are transmitted in an environment with lower interference due to a lower number of hidden nodes, the conventional devices enable RTS/CTS based on the larger packet size. Accordingly, the RTS/CTS enablement by the conventional devices is excessive in this second scenario resulting in increased resource consumption (e.g., delay, power, processor, memory, bandwidth, throughput, etc.).

However, according to embodiments, improved devices for implementing an adaptive RTS/CTS mechanism are provided. For example, the improved devices may determine whether the improved devices are experiencing higher interference caused by a higher number of hidden nodes based on PER measurements. According to embodiments, the PER measurements may be performed in both an RTS/CTS enable state and an RTS/CTS disable state. The improved devices may adaptively enable or disable the RTS/CTS mechanism according to the determination of whether higher interference is being caused by a higher number of hidden nodes. Accordingly, the improved devices overcome the deficiencies of the conventional devices to reduce data transmission failure in the first scenario discussed above, thereby increasing data rates and throughput, and to reduce resource consumption (e.g., delay, power, processor, memory, bandwidth, throughput, etc.) in the second scenario discussed above.

According to embodiments, operations described herein as being performed by the first node 100-1, the second node 100-2, the third node 100-3, the fourth node 100-4, the fifth node 100-5, the node apparatus 300, the RTS/CTS mechanism component 301, the PER measurement component 302, the data rate component 303, the device 800, the first acquisition module 810, the state changing module 820, the second acquisition module 830, the state determination module 840, the packet error rate measurement module 850, the state maintaining module 860, the electronic device 900 and/or the at least one processor 920 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the at least one memory 910). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments of the disclosure will readily come to the mind of those skilled in the art upon consideration of the specification and practice of the inventive concepts disclosed herein. This application is intended to cover any variations, uses, or adaptations of the present disclosure that follow the general principles of the disclosure and include commonly known or customary technical means in the art that are not disclosed herein. Embodiments provided in the specification are merely examples, and the scope and spirit of the disclosure is indicated by the following claims.

It is to be understood that the disclosure is not limited to the precise structure already described above and illustrated in the accompanying drawings, and that various modifications and changes may be made without departing from its scope. The scope of the present disclosure is limited only by the appended claims.

What is claimed is:

1. A method for RTS/CTS adaptive enablement, comprising:

changing an RTS/CTS disabled state to an RTS/CTS enabled state in response to determining that a first packet error rate satisfies a condition, the first packet error rate being measured in the RTS/CTS disabled state; and determining whether to change from the RTS/CTS enabled state to the RTS/CTS disabled state based on a second packet error rate being greater than or equal to a threshold, the second packet error rate being measured in the RTS/CTS enabled state.

2. The method of claim 1, further comprising:

measuring the first packet error rate or the second packet error rate according to a time period.

3. The method of claim 2, wherein the condition is that the first packet error rate is greater than the threshold; or the method further comprises changing the RTS/CTS enabled state to the RTS/CTS disabled state in response to determining that values of a plurality of third packet error rates remain stable or decrease.

4. The method of claim 3, wherein the determining whether to change from the RTS/CTS enabled state determines not to change from the RTS/CTS enabled state to the RTS/CTS disabled state based on the second packet error rate being less than the threshold.

5. The method of claim 3, wherein the method further comprises:

performing first operations including, changing from the RTS/CTS enabled state to the RTS/CTS disabled state in response to determining to change from the RTS/CTS enabled state to the RTS/CTS disabled state based on the second packet error rate being greater than or equal to the threshold, reducing a data rate, and re-measuring the first packet error rate; or performing second operations including, changing from the RTS/CTS disabled state to the RTS/CTS enabled state in response to determining a fourth packet error rate is greater than or equal to the threshold, and re-measuring one of the plurality of third packet error rates based on the changing from the RTS/CTS disabled state to the RTS/CTS enabled state.

6. The method of claim 1, further comprising:

re-measuring the first packet error rate in the RTS/CTS disabled state in response to determining that the first packet error rate does not satisfy the condition.

7. The method of claim 6, wherein the condition is the first packet error rate being greater than the threshold; or the method further comprises changing the RTS/CTS enabled state to the RTS/CTS disabled state in response to determining that a plurality of third packet error rates remain stable or decrease.

8. The method of claim 1, wherein the threshold is a packet error rate tolerance at a current data rate.

9. The method of claim 1, further comprising:

transmitting a data frame to a device while in the RTS/CTS disabled state or the RTS/CTS enabled state.

10. The method of claim 1, further comprising:

reducing a data rate in response to determining to change from the RTS/CTS enabled state to the RTS/CTS disabled state.

11. A device for RTS/CTS adaptive enablement, comprising: processing circuitry configured to, change an RTS/CTS disabled state to an RTS/CTS enabled state in response to determining that a first packet error rate satisfies a condition, the first packet error rate being measured in the RTS/CTS disabled state, and determine whether to change from the RTS/CTS enabled state to the RTS/CTS disabled state based on a second packet error rate being greater than or equal to a threshold, the second packet error rate being measured in the RTS/CTS enabled state.

12. The device of claim 11, wherein the processing circuitry is configured to measure the first packet error rate or the second packet error rate according to a time period.

13. The device of claim 12, wherein the condition is that the first packet error rate is greater than the threshold; or the processing circuitry is configured to change the RTS/CTS enabled state to the RTS/CTS disabled state in response to determining that values of a plurality of third packet error rates remain stable or decrease.

14. The device of claim 12, wherein the processing circuitry is configured to determine not to change from the RTS/CTS enabled state to the RTS/CTS disabled state based on the second packet error rate being less than the threshold.

15. The device of claim 13, wherein the processing circuitry is configured to:

perform first operations including, changing from the RTS/CTS enabled state to the RTS/CTS disabled state in response to determining the second packet error rate is greater than or equal to the threshold, reduce a data rate of the device, and re-measure the first packet error rate; or perform second operations including, changing from the RTS/CTS disabled state to the RTS/CTS enabled state in response to determining a fourth packet error rate is greater than or equal to the threshold, and re-measuring one of the plurality of third packet error rates based on the changing from the RTS/CTS disabled state to the RTS/CTS enabled state.

16. The device of claim 11, wherein the processing circuitry is configured to re-measure the first packet error rate in response to determining that the first packet error rate does not satisfy the condition.

17. The device of claim 16, wherein the condition is that the first packet error rate is greater than the threshold; or the processing circuitry is configured to change the RTS/CTS enabled state to the RTS/CTS disabled state in response to determining that a plurality of third packet error rates remain stable or decrease.

18. The device of claim 11, wherein the threshold is a packet error rate tolerance at a current data rate of the device.

19. The device of claim 11, wherein the processing circuitry is configured to transmit a data frame to another device in the RTS/CTS disabled state or the RTS/CTS enabled state.

20. A non-transitory computer-readable storage medium storing a computer program that, when executed by at least one processor, causes the at least one processor to perform a method, the method comprising:

changing an RTS/CTS disabled state to an RTS/CTS enabled state in response to determining that a first packet error rate satisfies a condition, the first packet error rate being measured in the RTS/CTS disabled state; and determining whether to change from the RTS/CTS enabled state to the RTS/CTS disabled state based on a second packet error rate being greater than or equal to a threshold, the second packet error rate being measured in the RTS/CTS enabled state.

* * * * *